UNITED STATES PATENT OFFICE.

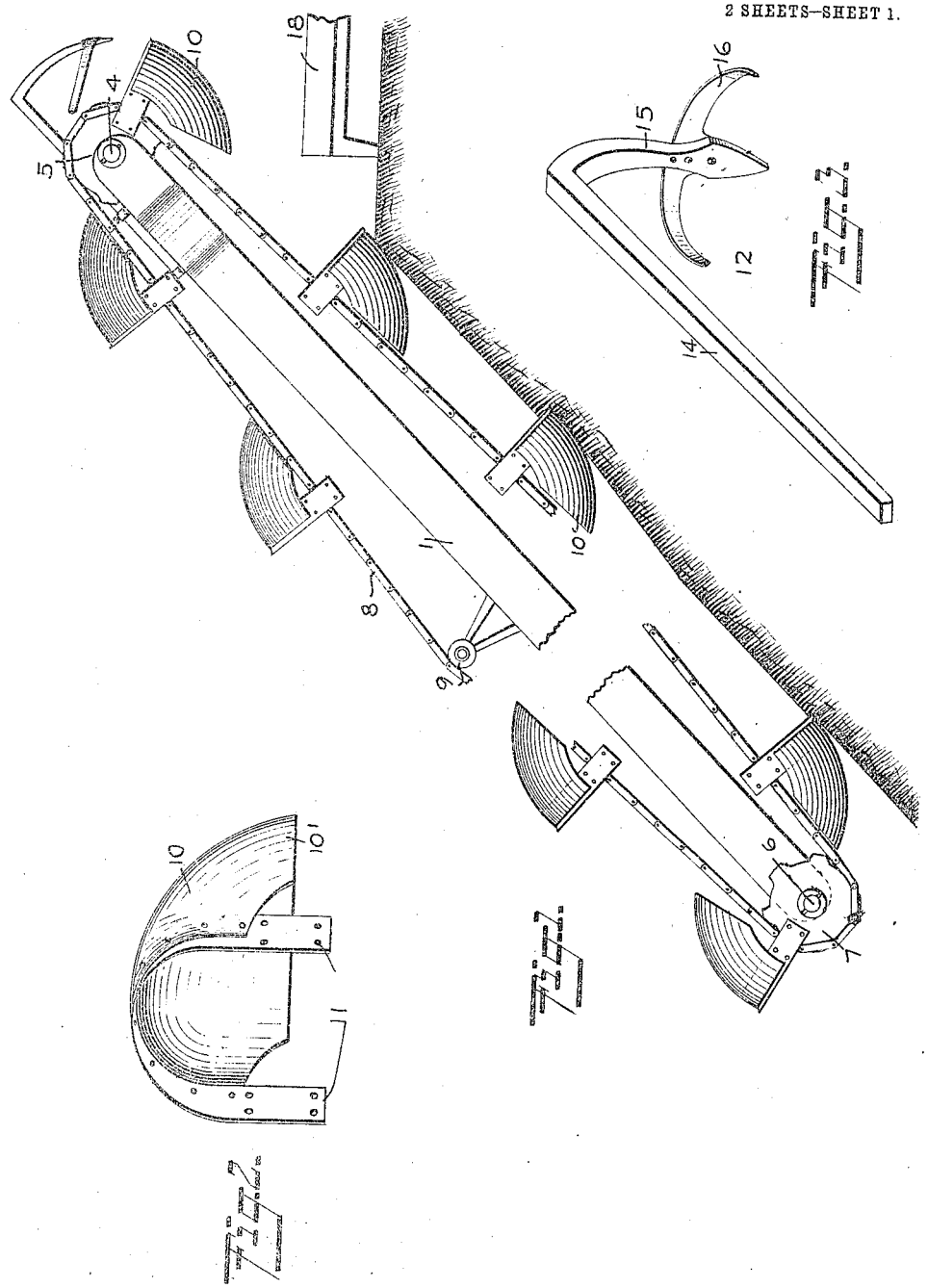

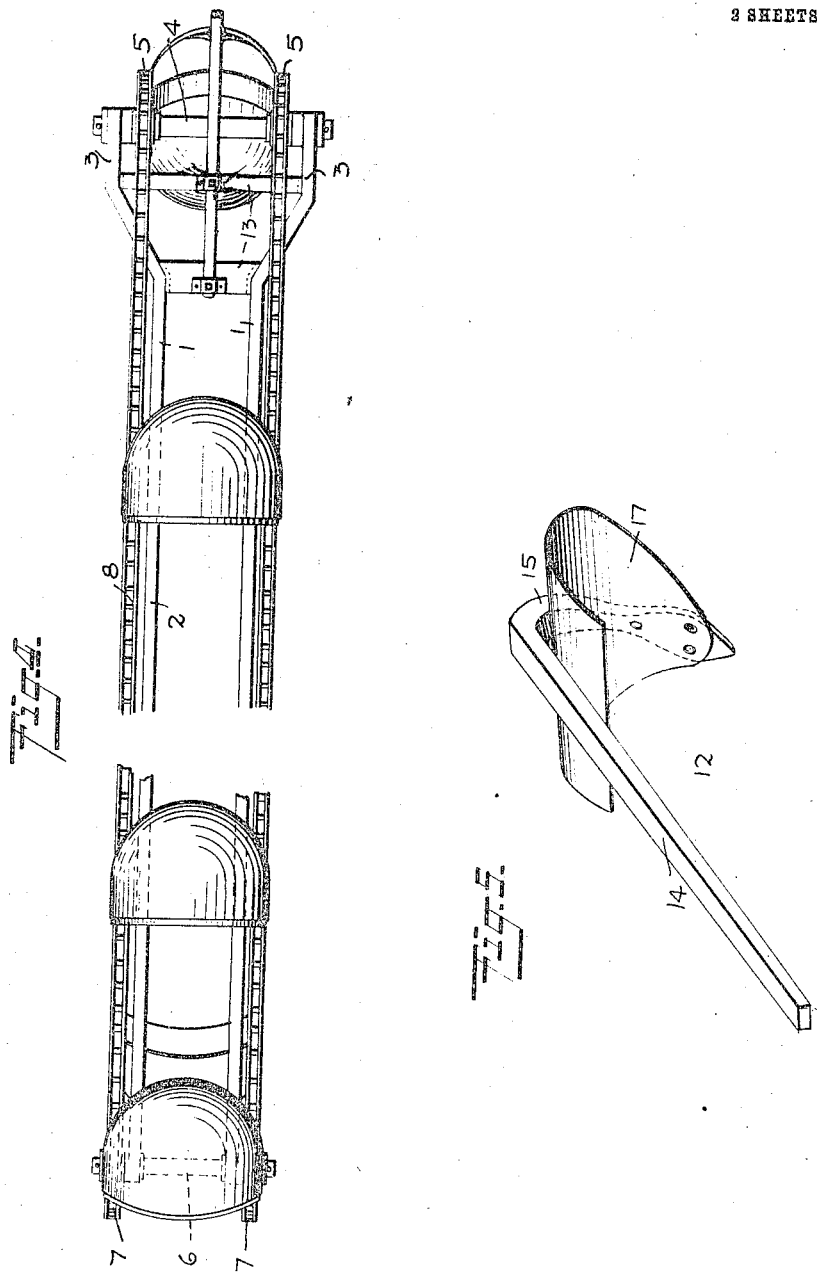

HERBERT W. SARGENT, OF FORT DODGE, IOWA.

DIGGING AND CLEANING APPARATUS FOR DIGGING-MACHINES.

1,052,972.

Specification of Letters Patent.  Patented Feb. 11, 1913.

Application filed December 21, 1910. Serial No. 598,553.

*To all whom it may concern:*

Be it known that I, HERBERT W. SARGENT, a citizen of the United States, and a resident of Fort Dodge, in the county of Webster and State of Iowa, have invented a new and Improved Digging and Cleaning Apparatus for Digging-Machines, of which the following is a full, clear, and exact description.

My invention relates to digging machines of the type wherein buckets or scoops are made to fill themselves by being scraped along the surface of the ground to be excavated, such, for example, as the end and sides of a trench or ditch.

It has for its object to provide an automatic cleaning or emptying device for the scoop or buckets; and the construction thereof comprises a scraper or cleaner arranged in the path of the buckets or scoops adjacent the point where the buckets deliver into a car, hopper or belt. After filling themselves, the buckets pass by the scraper or cleaner, which is shaped to fit the inside of the buckets, and in this way the load of earth in each bucket is forced out and drops into the car, hopper or belt, to be carried away and dumped.

Reference is to be had to the accompanying drawings forming a part of this specification, in which similar characters of reference indicate corresponding parts in all the views.

Figure 1 is a side elevation of my digging and cleaning apparatus at work upon the end of a ditch; Fig. 2 is a perspective view of one of the buckets thereof; Fig. 3 is a perspective view of one form of the cleaner or scraper; Fig. 4 is a top view of the digging apparatus, showing the cleaner attached to the framework thereof; and Fig. 5 is a perspective view of another form of scraper or cleaner.

On the drawings, the numeral 1 indicates a framework, which consists preferably of parallel side members 2, made of wood or metal, and each having an end bent outward, as shown at 3. These ends 3 support a shaft or spindle 4, whereon are mounted a rotatable guiding means 5, preferably in the form of sprocket wheels, as shown; and at the opposite ends of the bars 2 is mounted a similar shaft or spindle 6, carrying sprocket wheels 7. Over these sprocket wheels are passed conveyer chains 8, two of which are shown, each of them forming an endless conveyer in the form of an elongated closed loop, when in position.

9 is a guide roller arranged on the top of the framework 1 and at a point near the center thereof.

The buckets or scoops are shown at 10, and are provided along their front edges with a U-shaped member 11, which serves to stiffen the front edges of the buckets so as to form a rigid digging edge. The ends of these members are attached one to each of the sprocket chains 8, as shown. Each of these buckets has its front open, and the inside thereof is perfectly smooth, the bottom curving evenly upward from the front to the back and terminating in a rear edge 10'.

The scraper is shown at 12, and is held rigidly in position between the bars 2, adjacent the bent-out ends 3, by means of cross-braces 13. Each scraper consists of a shank 14 having an outer down-turned end 15, to which may be fastened either a narrow scraping bar 16, as shown in Fig. 3, or a broad piece of sheet metal, as shown at 17, in Fig. 5. The scraping bar 15 is bent on an arc which is concentric with the circumference of the sprocket wheels 5, and the back of each of the buckets 10 is curved on an arc of equal radius, so that the down-turned end 15 will coincide with the curvature of the bottom of the bucket 10 and pass over the center of the bottom of each bucket as it scrapes it clean. The scraping bar 16 and the scraping plate 17 are also bent to fit the inside curvature of each of the buckets, so that as each of the buckets is caused by the conveyer to pass over the scraper, the entire load of dirt which each bucket contains will be pushed out over the rear edge thereof, thus forming a thoroughly efficient apparatus for causing the buckets to empty themselves. Further, as each of the buckets passes over the cleaning attachment 12, as shown in Fig. 1, the front edge is gradually elevated, and the lower end depressed, so that the only resistance to the operation of cleaning and emptying the buckets is that due to the friction of the load, as the scraper pushes the dirt out to the depressed rear end of the buckets 10.

18 shows a hopper or car arranged underneath the scraping means so as to receive the contents of each bucket as the same is emptied.

While I have shown sprocket wheels and chains, it is obvious that I may use another form of conveyer, such as a belt passing over smooth rollers or pulleys. The conveyer is caused to revolve by means of a gas engine or any other suitable engine, which may be connected to transmit power to either of the shafts 4 or 6, by means of gearing or any other form of transmission mechanism. The power apparatus is not shown, as my invention does not relate thereto, but the manner in which my digging apparatus is operated by an engine will be well understood by any one skilled in the art.

It will be observed that the buckets are connected to the chains at their front ends. Consequently, if they are heavily loaded there will be considerable strain on the chain links and braces 11, when the buckets begin to pass around the sprocket wheels 5 on their return movement, just before they are emptied. Now if, from constant wear and use, the parts should begin to get loose, so that the buckets 10 sag a little at their lower ends when they start to press around the wheel 5, the down-turned curved end 15 of the shank 12 here serves an additional purpose which is very important. This curved end 15 will keep the bottom of the buckets concentric with the shaft 4 and wheels 5, and in this way the scraper will not only clean out each bucket, but it will also assist in guiding and tilting it, and thus in great measure relieve the strain on the chain links and braces 11. Ordinarily, however, the buckets do not sag, but in passing over the wheel 5 will tip just the required extent to keep their bottoms parallel to the cleaner member 15.

Having thus described my invention, I claim as new and desire to secure by Letters Patent:

1. In a digging machine, the combination of a scoop or bucket, an endless movable conveyer forming an elongated loop, said bucket being attached to said conveyer and having an open digging end and a smooth upcurved bottom extending therefrom, terminating at the rear edge of the bucket, and a cleaner fixed adjacent to one end of said loop and curved concentrically with said end in the plane of the loop, said cleaner being located in the path of movement of the bucket and shaped to fit the inside thereof as it passes said cleaner.

2. In a digging machine, the combination of a scoop or bucket, a sprocket chain forming a loop and passing over sprocket wheels at one end of said loop, said bucket being attached to said chain and having its bottom curved concentric with the end of said loop, and a cleaning device fixed to the digging machine adjacent the end of said loop, and also curved to correspond with the curvature of said end, and being shaped to fit the bottom of said bucket, so as to scrape out the contents of said bucket as the bucket passes said cleaner.

In testimony whereof I have signed my name to this specification in the presence of two subscribing witnesses.

HERBERT W. SARGENT.

Witnesses:
H. M. PRATT,
HARRY L. SCHULTZ.